(12) United States Patent
Bay

(10) Patent No.: US 9,719,544 B2
(45) Date of Patent: Aug. 1, 2017

(54) GLUELESS JOINING DEVICES FOR INTERLOCKING WITH HOLLOW SHAFTS

(71) Applicant: Clean-Shot Archery, Inc., Kent, WA (US)

(72) Inventor: Larry R. Bay, Renton, WA (US)

(73) Assignee: Clean-Shot Archery, Inc., Seattle, WA (US)

( * ) Notice: Subject to any disclaimer, the term of this patent is extended or adjusted under 35 U.S.C. 154(b) by 0 days.

(21) Appl. No.: 14/803,008

(22) Filed: Jul. 17, 2015

(65) Prior Publication Data

US 2016/0017908 A1 Jan. 21, 2016

Related U.S. Application Data

(62) Division of application No. 13/726,063, filed on Dec. 22, 2012, now abandoned.

(60) Provisional application No. 61/609,892, filed on Mar. 12, 2012, provisional application No. 61/583,032, filed on Jan. 4, 2012.

(51) Int. Cl.
*F42B 6/04* (2006.01)
*F16B 13/06* (2006.01)
*F16B 29/00* (2006.01)
*F16B 7/02* (2006.01)
*A63B 53/02* (2015.01)

(52) U.S. Cl.
CPC ........... *F16B 13/063* (2013.01); *A63B 53/02* (2013.01); *F16B 7/025* (2013.01); *F16B 29/00* (2013.01); *F42B 6/04* (2013.01); *Y10T 29/49826* (2015.01); *Y10T 403/68* (2015.01)

(58) Field of Classification Search
CPC . F16B 29/00; F16B 7/025; B25G 3/28; F42B 6/04; F42B 6/06; F42B 6/08
USPC .................. 403/368, 370, 371; 473/583–585
See application file for complete search history.

(56) References Cited

U.S. PATENT DOCUMENTS

| | | | | |
|---|---|---|---|---|
| 582,948 | A * | 5/1897 | Pinover | B25G 3/28 403/277 |
| 4,856,929 | A * | 8/1989 | Smahlik | A47L 1/06 248/161 |
| 5,257,809 | A * | 11/1993 | Carrizosa | F42B 6/08 473/584 |
| 5,354,068 | A * | 10/1994 | Maleski | F42B 6/08 403/371 |
| 7,422,526 | B2 * | 9/2008 | Nemeckay | A63B 57/00 403/370 |

(Continued)

*Primary Examiner* — Joshua Kennedy
(74) *Attorney, Agent, or Firm* — Skaar Ulbrich Macari, P.A.

(57) ABSTRACT

A glueless shaft joining system, apparatus and method are disclosed. A base insertable into the hollow interior of the shaft can include a plurality of flexible fingers separated by a slot defined between each of the adjacent flexible fingers. The interior of the base is hollow and includes a threaded portion adjacent to the distal end that extends inwards in a proximal direction. A set screw can be inserted into the threaded portion of the hollow interior of the base. The set screw includes a threaded head portion and a non-threaded tail portion that diverges as it extends away from the head portion. The tail portion deflects the flexible fingers laterally outwardly as the set screw is advanced in the proximal direction through the base. A component, such as a broad head or arrow nock can be coupled to the insert as desired.

15 Claims, 18 Drawing Sheets

(56) References Cited

U.S. PATENT DOCUMENTS

| | | | | |
|---|---|---|---|---|
| 8,215,863 | B2 * | 7/2012 | Sohn | A45B 9/00 |
| | | | | 135/75 |
| 8,328,657 | B1 * | 12/2012 | Demkowski | A63B 53/12 |
| | | | | 473/239 |
| 2009/0247333 | A1 * | 10/2009 | Bottelsen | F42B 6/04 |
| | | | | 473/585 |

* cited by examiner

GLUELESS JOINING DEVICES FOR INTERLOCKING WITH HOLLOW SHAFTS

PRIORITY

This application is a divisional of U.S. patent application Ser. No. 13/726,063, filed Dec. 22, 2012, which claims the benefit of priority based on U.S. Provisional Application Ser. No. 61/583,032 filed on Jan. 4, 2012 and U.S. Provisional Application 61/609,892 filed on Mar. 12, 2012, all of which are hereby incorporated by reference herein in their entirety.

FIELD

The present invention relates to tubular members, such as arrow shafts and golf clubs, and more particularly, to glueless joining mechanisms, systems and methods for joining shaft portions, securing broad heads, field tips, nocks, fletching systems and other devices to a hollow shaft.

BACKGROUND

Certain conventional arrow shafts, and particularly relatively small diameter (e.g., 0.204" and 0.165" inside diameter) shafts, require shaft inserts to be placed inside of the arrow shaft to allow for attachment of a the arrow head, field point, nocks and fletching systems. Conventional inserts, such as that discussed in U.S. Pat. No. 7,115,055, require that the insert be glued into the shaft. Thus, the insert, whether fully inside, half-out or outsert configuration, cannot be removed from the shaft or adjusted if necessary. This is disadvantageous because sometimes the arrow head must be changed. It is unlikely that the blades of the replacement head will properly align with the vanes of the arrow, which is desired for optimal flight performance. Also, the shaft of the arrow as discussed in U.S. Pat. No. 7,115,055 requires preparation in the form of beveling the opening before receiving the broadhead. The beveling operation weakens the shaft, is inconvenient and may impede performance if imprecisely performed. Thus there is a need to provide for an improved arrow insert system, device and method that addresses, at least in part, the shortcomings of the conventional arrow inserts. Many of these same drawbacks also apply to other situations where an item needs to be joined to a hollow shaft, such as with golf clubs.

SUMMARY

The present disclosure teaches various example embodiments that address certain disadvantages in the prior art. A glueless shaft joining system, apparatus and method are disclosed. An expandable insert, half-out insert or outsert is disposable at least partially into the inside of the shaft of an arrow or other tubular member such as a golf club shaft.

A glueless shaft joining system, apparatus and method are disclosed. An expandable insert, half-out insert or outsert is disposable at least partially into the inside of the shaft of an arrow or other tubular member such as a golf club shaft. In one embodiment, a set screw can be tightened to expand finger elements to lock the insert and arrowhead attached thereto in place. Alternatively, a screw can lengthwise contract base and wedge elements along contacting portions of respective ramp portions, thereby expanding the effective outside diameter of the device inside of the shaft to lock it into place. In either case, a component, such as a broad head, can be aligned, removed or indexed as desired.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1:
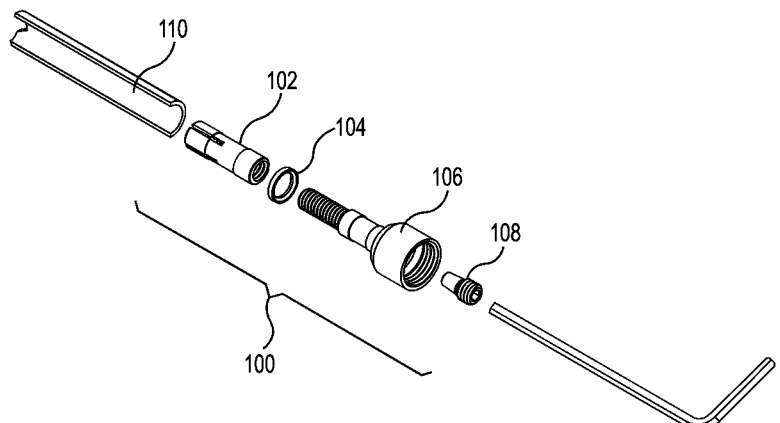
FIG. 1 is an assembly drawing of an arrow head insert according to an example embodiment of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the spirit and scope of the invention as defined by the appended claims.

DETAILED DESCRIPTION

In the following description, the present invention will be explained with reference to example embodiments thereof. However, these example embodiments are not intended to limit the present invention to any specific environment, applications or particular implementations described in these example embodiments. Therefore, description of these example embodiments is only for purpose of illustration rather than limitation. It should be appreciated that, in the following example embodiments and the attached drawings, elements unrelated to the present invention are omitted from depiction; and dimensional relationships among individual elements in the attached drawings are illustrated only for ease of understanding, but not to limit the actual scale.

In this description the terms "insert", "half-out insert" and "outsert" will be used. An "insert" refers to a component configured to be fully contained within a shaft except for a flanged portion on one end, if present, that may protrude beyond the end of the shaft in which the insert is located. A "half-out insert" is an insert configured to be partially contained within the arrow shaft, but having a significant portion extending outside of the arrow shaft, wherein the receiving portion defined in the insert extends partially inward of the arrow shaft end. In an "outsert", the receiving portion is maintained entirely outside of the end of the arrow shaft, though a locking mechanism portion may be located inside or outside of the arrow shaft. Those skilled in the art will recognize that the various interlocking mechanisms disclosed herein can be configured as full inserts, half-out inserts and outserts, even if not explicitly described as such, without departing from the scope of the invention.

Figure 2:
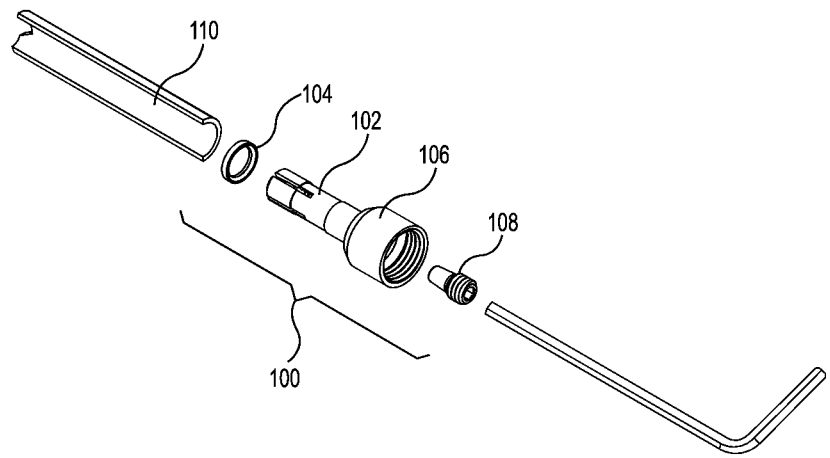
FIG. 2 is an assembly drawing of an arrow head that does not require an insert as the arrowhead male portion expands to lock into the arrow shaft according to an example embodiment of the present invention.
Figure 3:
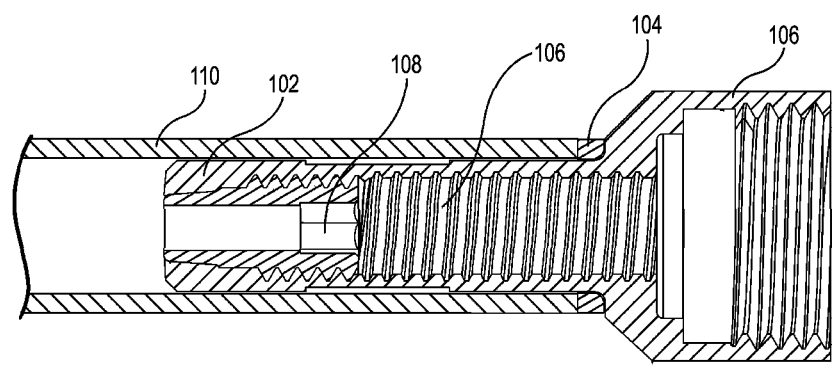
FIG. 3 is a cross-sectional assembly of an arrow head that doesn't require an insert according to an example embodiment of the present invention.

Referring to FIGS. 1-3, arrowhead insert 100 includes an expandable shaft insert 102, a beveled spacer 104, an indexable insert tool or receiving element 106 and a set screw 108. The male threaded portion of the receiving element 106 is screwed into the respective female threaded end of the expandable insert 102. The beveled spacer 104 is placed over the joined insert element/receiving element with the beveled side facing away for the arrow shaft. The joined expandable insert, tapered set screw, indexable insert tool and spacer is then inserted into the hollow inside of the arrow shaft 110. The set screw 108 is then inserted though the hollow aforementioned assembly until it contacts the internal threads of the expandable insert element 102. Tightening the set screw 108 using a tool keyed to the set screw, such as an Allen wrench in this example, causes the expandable portions of the insert element to expand equally outwardly and lock the entire assembly 100 into place within the arrow shaft 110 (or golf club shaft or other hollow shaft).

Figure 4:
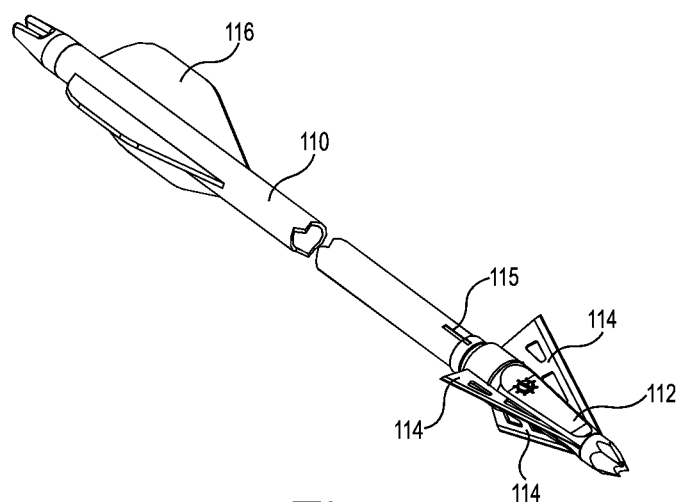
FIG. 4 is a perspective showing a broadhead indexed to an arrow according to an example embodiment of the present invention.
Figure 5:
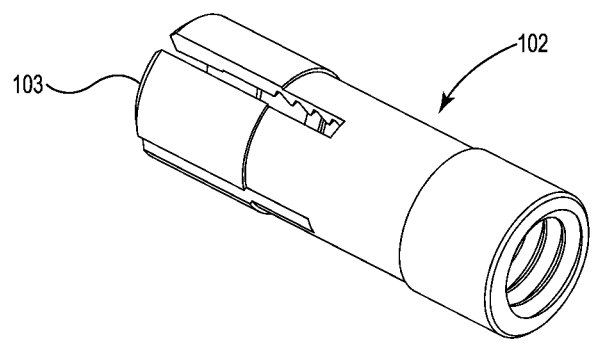
FIG. 5 is a perspective view of an expandable insert element of an arrow head insert according to an example embodiment of the present invention.
Figure 6:
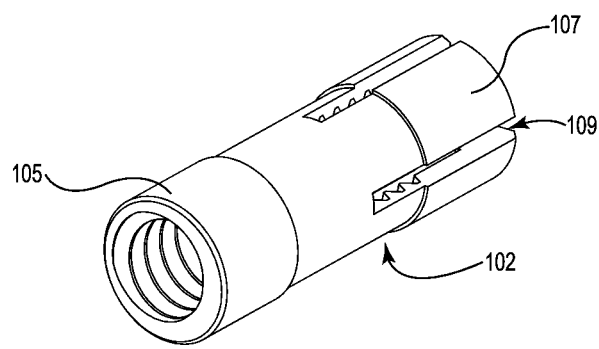
FIG. 6 is a perspective view of an expandable insert element of an arrow head insert according to an example embodiment of the present invention.
Figure 7:
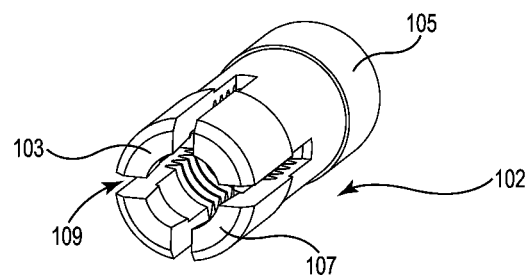
FIG. 7 is a perspective view of an expandable insert element of an arrow head insert according to an example embodiment of the present invention.
Figure 8:
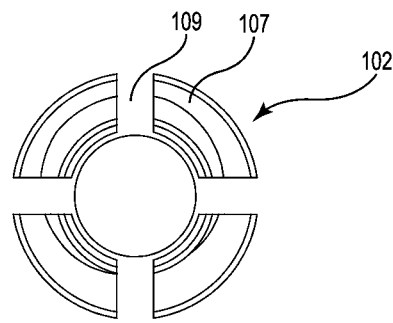
FIG. 8 is an end view of an expandable insert element an arrow head insert according to an example embodiment of the present invention.
Figure 9:
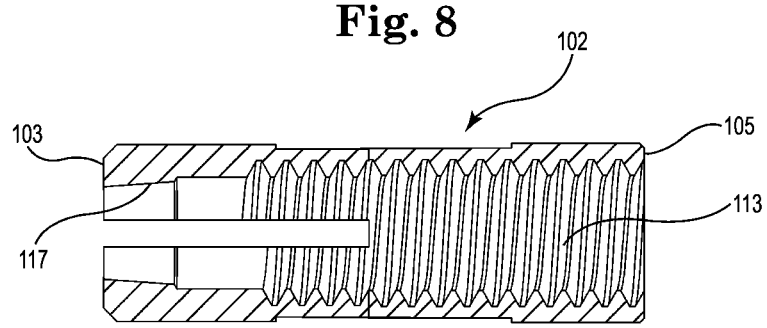
FIG. 9 is a side cross-sectional view of an expandable insert element of an arrow head insert according to an example embodiment of the present invention.

Referring now to FIG. 4, an arrow head 112, such as a broad head, can be screwed into the threaded receiving portion of the receiving element 106. For optimal performance, it is desirable to index or axially align the blades 114 of the arrow head 112 with the vanes 116 of the arrow shaft 110. If the alignment is not ideal when the arrow head is fastened to the insert 100, the set screw can be loosened so that the insert can be rotated with respect to the shaft in an amount necessary to result in the desired alignment. Then the set screw can be tightened once again to maintain the desired alignment. A mark 115 can be provided to indicate the proper arrow index.

The various physical features of the expandable insert element 102 can be seen in FIGS. 5-9. Expandable insert element 102 has a generally cylindrical outer surface and includes an expandable end 103 and opposing non-expandable end 105. The expandable end 103 comprises a plurality of fingers 107 separated by a channeled or slotted portion 109. A hollow interior 111 extends lengthwise through the element 102 form end-to-end. A portion of that hollow interior is threaded 113 and a portion is tapered 117. The tapered inner portion 117 facilitates expansion of the finger elements 107 as the set screw is tightened (i.e. located deeper) inside of the insert element 102.

Figure 10:
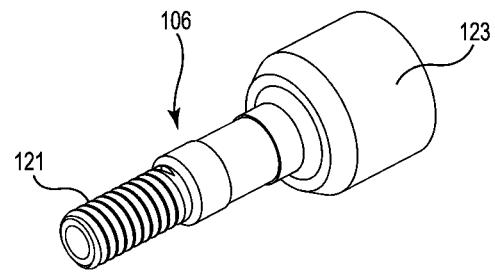
FIG. 10 is a perspective view of an indexable insert tool of an arrow head insert according to an example embodiment of the present invention.
Figure 11:
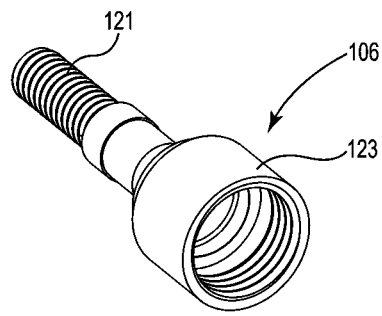
FIG. 11 is a perspective view of an indexable insert tool of an arrow head insert according to an example embodiment of the present invention.
Figure 12:
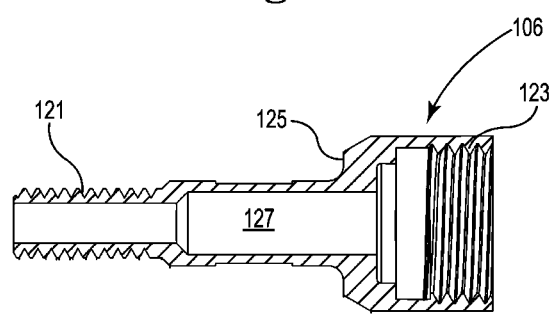
FIG. 12 is a side cross-sectional view of an indexable insert tool that allows an open path for an Allen wrench to pass through the insert tool to tighten the tapered set screw and expand the insert to lock it into place according to an example embodiment of the present invention.

The various physical features of the receiving element 106 can be seen in FIGS. 10-12. The receiving element includes a threaded shaft portion 121 adjacent to a first end that is engageable with the threaded portion 113 of the expandable insert element. An opposing end defines an adapter portion 123 that has an inside radius and threads to receive a threaded projection of a broad head or other component to be joined with the hollow shaft. The adapter portion defines a shoulder portion 125 that abuts against either the end surface of the hollow arrow shaft or against a spacer. In the later configuration, the shoulder can be beveled, if necessary, to ensure an acceptably secure interlock with the hollow shaft. The receiving element 106 further includes a hollow interior 127 extending there through to permit access to the set screw.

Figure 13:
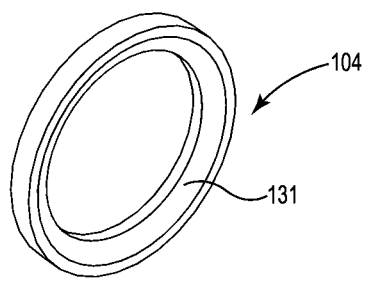
FIG. 13 is a perspective view of a beveled spacer of an arrow head insert according to an example embodiment of the present invention.
Figure 14:
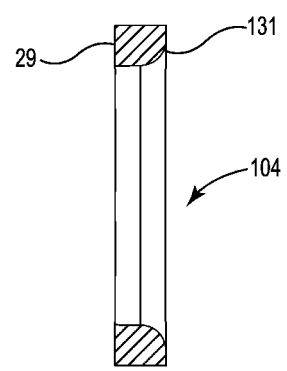
FIG. 14 is a side cross-sectional view of a beveled spacer of an arrow head insert according to an example embodiment of the present invention.
Figure 15:
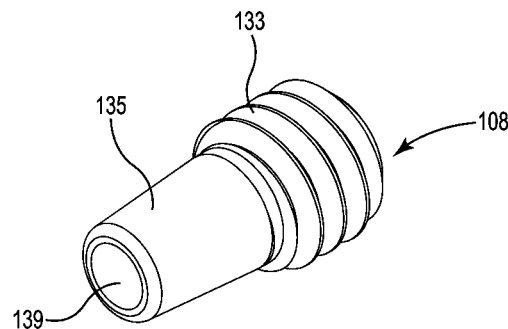
FIG. 15 is a perspective view of a tapered set screw of an arrow head insert according to an example embodiment of the present invention.
Figure 16:
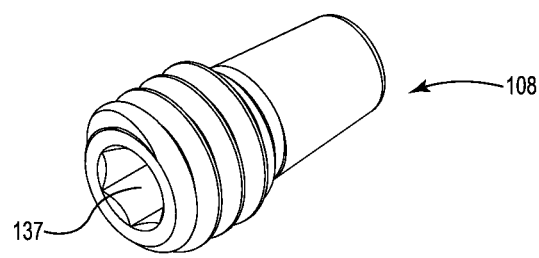
FIG. 16 is a perspective view of a tapered set screw of an arrow head insert according to an example embodiment of the present invention.
Figure 17:
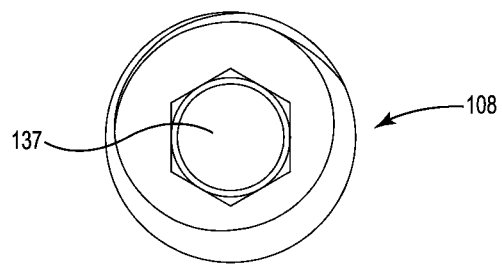
FIG. 17 is an end view of a set screw of an arrow head insert according to an example embodiment of the present invention.
Figure 18:
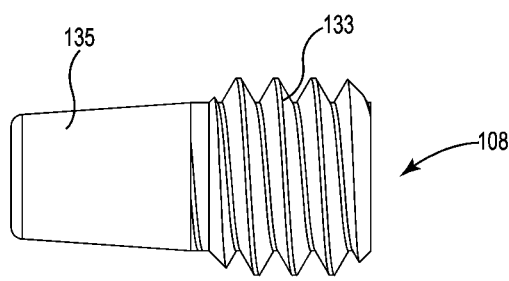
FIG. 18 is a side view of a set screw of an arrow head insert according to an example embodiment of the present invention.
Figure 19:
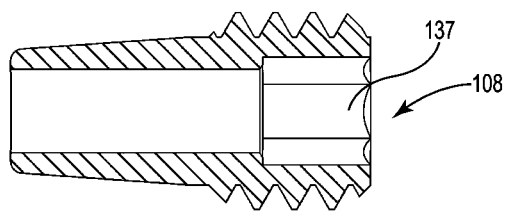
FIG. 19 is a side cross-sectional view of a set screw of an arrow head insert according to an example embodiment of the present invention.

The various physical features of the beveled spacer 104 can be seen in FIGS. 13-14. The spacer is generally hoop-shaped and defines a first flat side 129 and a second beveled side 131. The flat side abuts against the outer end of the arrow shaft. The beveled side mates with the corresponding beveled shoulder 125 of the receiving element 106. The spacer 104 thus eliminates the need to bevel the end of the arrow shaft for proper mating of a receiving element with an arrow shaft end surface. But it should be noted that the invention can be practiced without the use of the spacer in some embodiments without departing from the scope of the invention.

And the various physical features of the tapered set screw can be seen in FIGS. 15-19. The set screw comprises a threaded portion 133 and a smooth tapered portion 135. The end surface adjacent the threaded end defines a keyed recess 137 for receiving a tool such as an allen wrench. This permits the user to selectively rotate the set screw using widely available tools. Those skilled in the art will recognize that many other types of keyed recess shapes can be used without departing from the scope of the invention.

The smooth tapered portion 135 of the set screw can be solid or hollow depending on the desired weight of the component. The set screw example shown includes a hollow portion 139 extending through the component. This results in a lighter component compared to a solid piece.

In use, the tapered surface 135 of the set screw 108 pushes outwardly against the corresponding tapered inner surface 117 of the expandable insert element 102 as the set screw travels through the threaded portion 113 from the non-expandable end 105 to the expandable end 103. The farther that the set screw travels towards the expandable end 103, the greater the extend of the outward deflection of the finger elements 109. The depth of the threaded portion 113 in the expandable insert element 102 can be defined to ensure that the set screw will not travel so far that the resulting expansion ruptures or damages the shaft. The user can also be provided with a safe maximum torque rating for a given shaft so that the shaft is not damaged or ruptured. The user can utilize a commercially available torque wrench to measure the torque applied.

Figure 20:
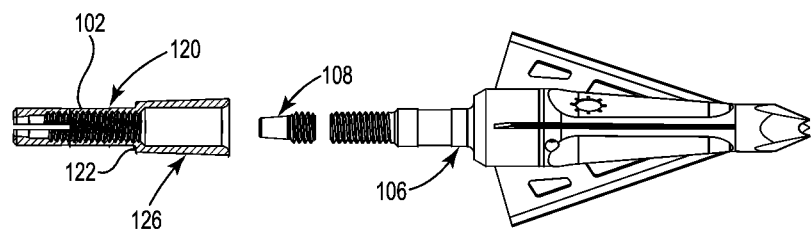
FIG. 20 is a side assembly view drawing of an arrow head half-out insert according to an example embodiment of the present invention.
Figure 21:
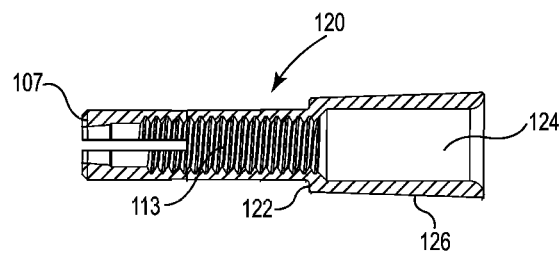
FIG. 21 is a side cross-sectional view of an expandable female half-out insert adaptor of an arrow head insert system according to an example embodiment of the present invention.
Figure 22:
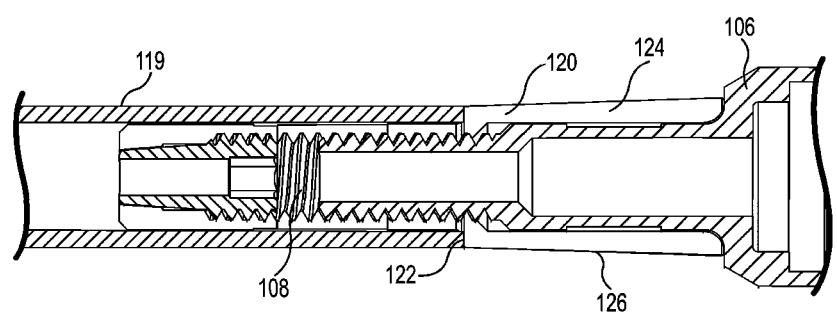
FIG. 22 is a side cross-sectional view of an arrow head half-out insert system according to an example embodiment of the present invention.

Referring to FIGS. 20-22, an additional embodiment of the arrow insert system is shown. The expandable insert 102 shown here is configured as a female half-out insert 120. The half-out insert 120 is insertable into the inside diameter of an arrow shaft up to the point that the shoulder or flanged portion 122 is encountered, thereby preventing further insertion. A female receiving portion 124 then extends beyond the end of the arrow shaft 119. The diameter and outside surface 126 of the receiving portion 124 is tapered to match the outside diameter of the arrow shaft 119. Note that the arrow shaft can be cut down (e.g. 0.500 inches) in length to account for the length of the protruding receiving portion, thereby maintaining the original overall shaft length. The tapered set screw 108 is insertable into the inner threaded portion 113 of the female insert 120, and the finger elements 107 are thereby expanded inside of the shaft to secure the insert to the arrow shaft. The respective tapering of the surfaces of the set screw 108 and insert 120 help prevent over tightening of the set screw that could cause the arrow shaft to split or break. These components are shown assembled in the cross-sectional view of FIG. 22. Note that a part of the threaded portion of the set screw 108 is not shown in cross-sectioning.

This preceding configuration is particularly adapted to micro arrow diameter shafts, which ordinarily require specialized arrow heads adapted to fit the narrow inside diameter (e.g. 0.165 to 0.204 inches) of the shaft. The embodiment of FIGS. 20-22 allows standard 8-32 threaded broadheads to be used with these micro-series and similarly-sized shafts. In addition, this embodiment requires no glue, is stronger than glued inserts, allows for replacement and allows the end user to index their blades to the arrow vanes to tune the flight of the arrow with a broadhead attached. Other threading configurations, such as 6-40 threads, can be used without departing from the scope of the invention.

The outer diameter of the female receiving portion 124 can also be slightly larger than the outside diameter of the shaft 119. In such embodiments, as will be discussed in greater detail below, the shoulder portion 122 can extend back over the interlocking portion to define a collar portion and a recess to receive a portion of the end of the shaft 119. In such configuration, the collar extends over the outer diameter of the shaft to capture the shaft by the internal expansion generated by the finger elements expanding in response to the set screw, while the outer collar portion stops further expansion of the shaft. This configuration helps prevent fracture or splitting of the shaft and also ensures a rigid mating of the shaft with the insert.

Figure 23:
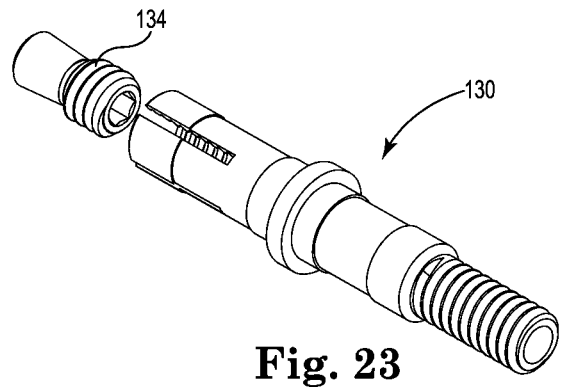
FIG. 23 is a perspective view of an expandable male post insert of an arrow head insert or shaft joining system according to an example embodiment of the present invention.
Figure 24:
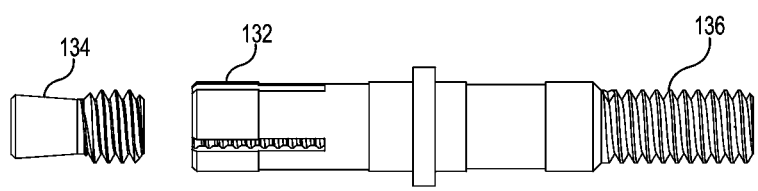
FIG. 24 is a side view of an expandable male post insert of an arrow head insert system according to an example embodiment of the present invention.
Figure 25:
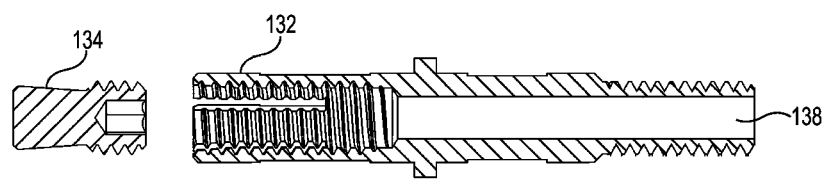
FIG. 25 is a side cross-sectional view of an expandable male post insert of an arrow head insert system according to an example embodiment of the present invention.
Figure 26:
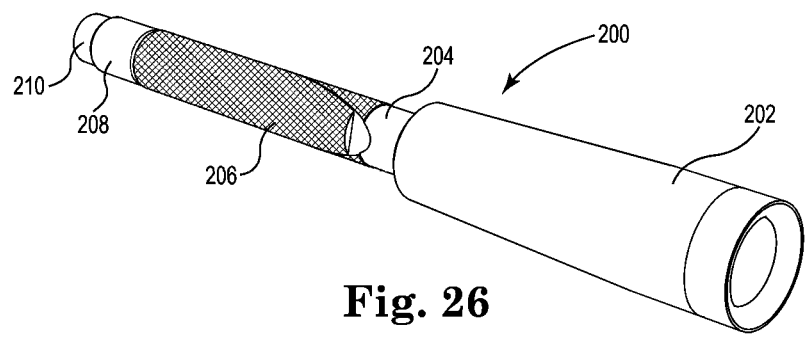
FIG. 26 is a perspective view of an arrow head outsert according to an example embodiment of the present invention.
Figure 27:
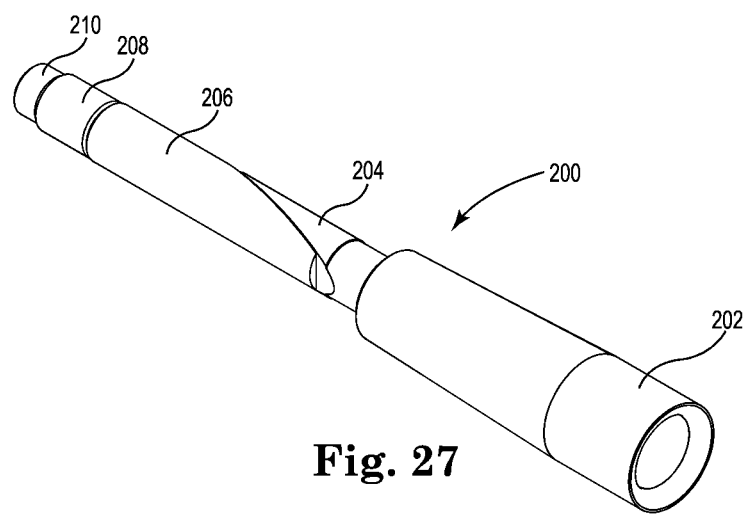
FIG. 27 is a perspective view of an arrow head outsert according to an example embodiment of the present invention.
Figure 28:
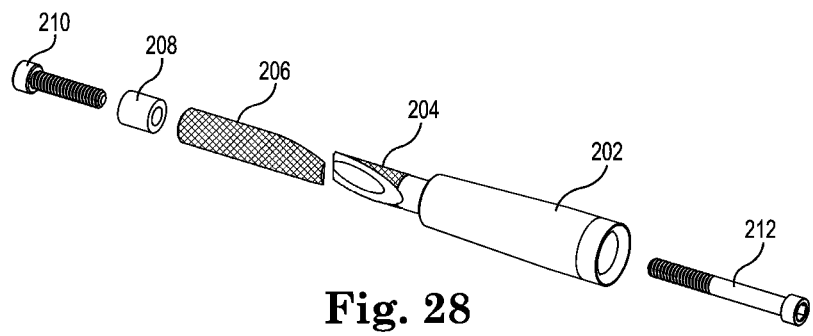
FIG. 28 is an exploded assembly drawing of an arrow head outsert according to an example embodiment of the present invention.
Figure 29:
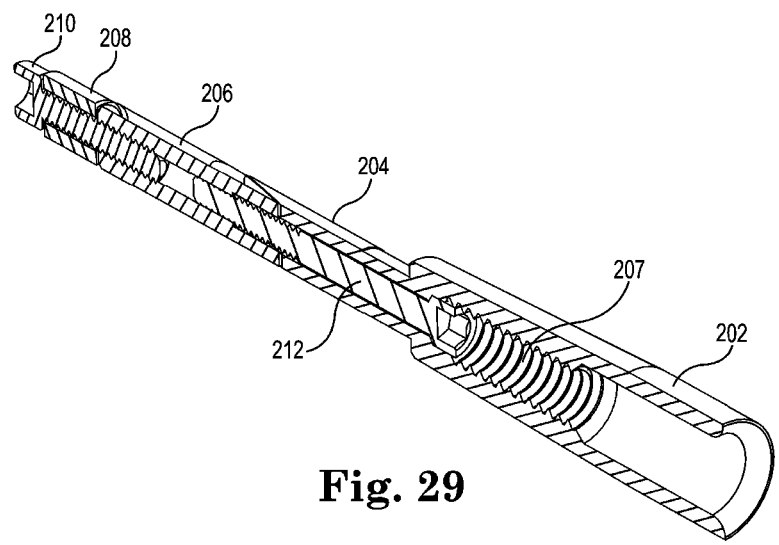
FIG. 29 is a cross-sectional perspective view of an arrow head outsert according to an example embodiment of the present invention.

Referring to FIGS. 23-25, a further embodiment is shown, wherein an expandable male post insert 130 is provided. The expandable male post insert 130 allows the user to add different sections to the arrow shaft (and without the need for epoxy or glue). Arrows can thus be put together in sections, which helps to increase the arrow spline strength and adds flexibility to fix arrows that may become damaged in the field. As can be seen from the figures, the expandable end 132 is inserted into the arrow shaft. A reverse-tapered set screw 134 is then recessed into the expandable end to lock the insert 130 to the inside diameter of the arrow shaft. Access to the set screw is from the opposing male threaded end 136 via a hollow channel 138 though the insert. The male threaded end 136 can then be used to join additional sections, or a fletched end of an arrow shaft with a female insert that is glueless or glued into place.

Referring to FIGS. 26-35 an outsert 200 for joining an arrow tip to an arrow shaft is shown. The outsert 200 is generally tubular and comprises a female threaded portion 202 on one end for receiving a male threaded component such as a an arrow head. The opposing end comprises two wedge portions 204 and 206 that expand the effective outside diameter when moved towards one another, thereby contracting the length of the outsert 200.

The outer surfaces of the wedge portions 204 and 206 can be provided with stippling, knurled surface or other roughened texture to aid in gripping the inside surface of the shaft to which it mates.

Figure 30:
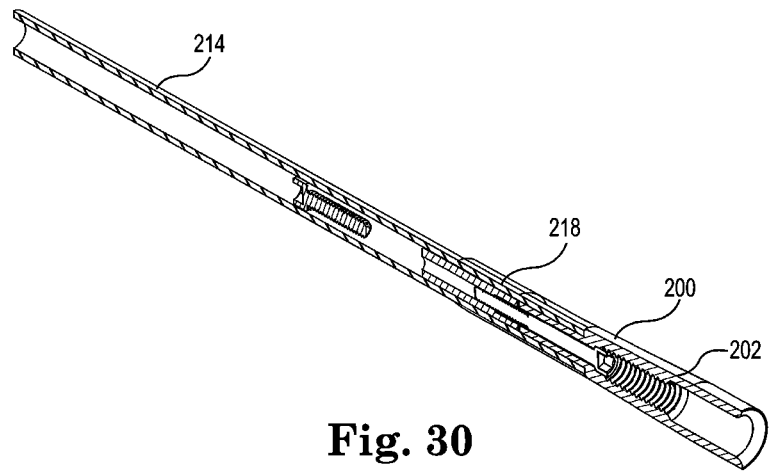
FIG. 30 is a cross-sectional perspective view of an arrow head outsert in a shaft according to an example embodiment of the present invention.
Figure 31:
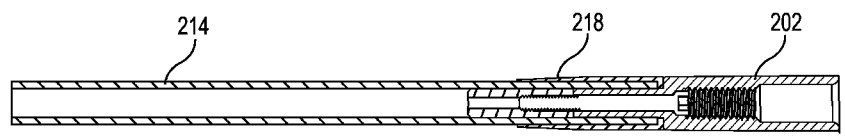
FIG. 31 is a cross-sectional side view of an arrow head outsert in a shaft according to an example embodiment of the present invention.
Figure 32:
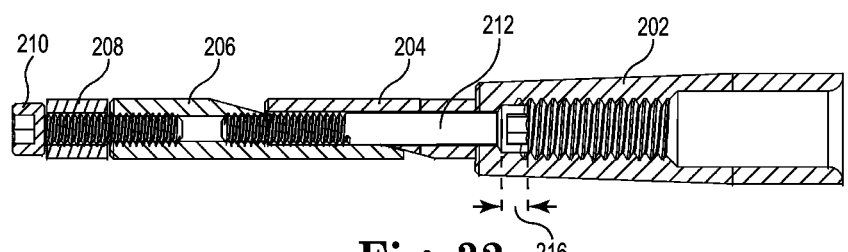
FIG. 32 is a cross-sectional side view of an arrow head outsert according to an example embodiment of the present invention.
Figure 33:
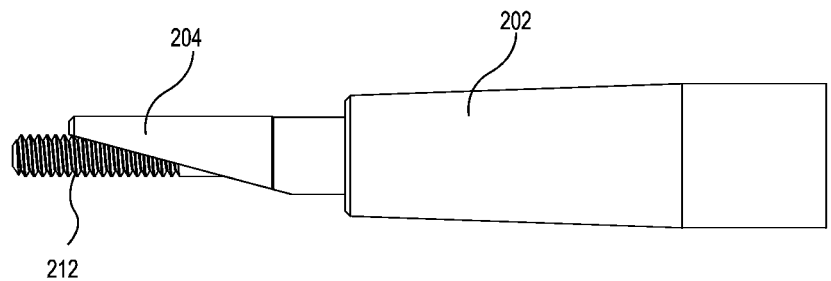
FIG. 33 is a side view of a receiving portion of an arrow head outsert according to an example embodiment of the present invention.
Figure 34:
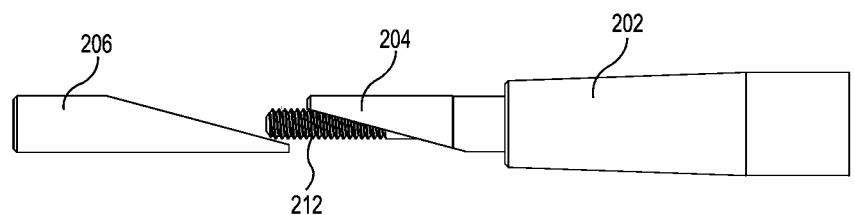
FIG. 34 is an assembly view of an arrow head outsert according to an example embodiment of the present invention.
Figure 35:
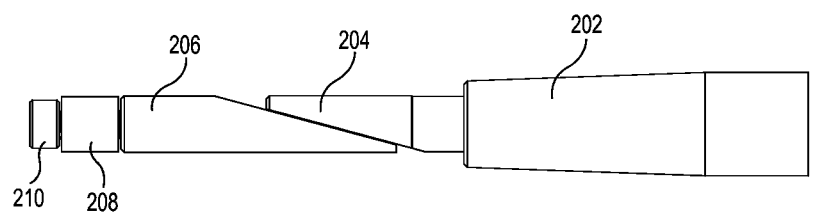
FIG. 35 is a side view of an arrow head outsert according to an example embodiment of the present invention.

An adjustable weight 208 and retention screw 210 are disposable in the end of the outermost wedge portion 206 so that the user can selectively adjust arrow weight. An adjustment screw 212 (shown in FIG. 28) is provided through an aperture in the female threaded portion 202 and the first wedge portion 204 and into internal threading of the second wedge portion 206 in order to retract the second wedge portion 206 with respect to the first wedge portion 204. FIGS. 30-31 show a shaft 214 joined to the outsert 200.

In use, referring to FIGS. 28-35, the adjustment screw 212 is inserted through an aperture defined in the female end 202 of the outsert until it extends beyond the first wedge portion 204. Then the second wedge portion 206 is aligned so that the screw 212 threads into the second wedge portion. If desired, a weight 208 is secured to the opposite end of the wedge portion 208 with a retention screw. Then the assembly is inserted into the arrow shaft and the adjustment screw is tightened until the outsert is secured therein. This securing is performed by turning the adjustment screw in a retraction direction to cause the base portion and the wedge portions to move towards one another so that the second tapered ramp portion of the wedge portion slides along the first tapered ramp portion of the base portion, thereby also causing the respective portions to move outwardly as well. This axially outward or movement effectively increases the diameter of the assembly beyond the diameter of either the wedge or base portions, thus defining an interlocking diameter.

An additional aspect of certain embodiments is the collar extension 218, shown in FIGS. 30-31, that extends over the outside diameter of the shaft 214. This feature locks the outsert to both of the inside diameter and the outside diameter of the shaft 214 at the same time. Thus this configuration captures the side wall of the shaft. It can also adjust the spine measurement of the shaft by extending or reducing the reach of the collar 218 over the shaft's outside diameter 214. It further helps guard against shaft failure due to over tightening of the adjustment screw 112.

As explained previously, this configuration shown in FIGS. 26-35 is called an outsert, not an insert or half-our insert, because the female threaded portion that receives the male threaded portion of an arrow tip, nock or fletching system is maintained completely external to the arrow shaft. Only the retention wedge portions 204, 206 are located inside of the shaft (and the weight 208 and retention screw 210, if present).

The outsert according to the various aspects in the embodiments of FIGS. 26-35 is particularly useful for the increasingly popular 0.165 inch "micro" inside diameter shafts used in archery. The female threaded portions 207 for receiving the arrow component allow for the use of standard broadheads and nocks with these relatively small diameter shafts. However this joining system is adaptable to 0.204 as well as other shaft inside diameters.

Figure 36:
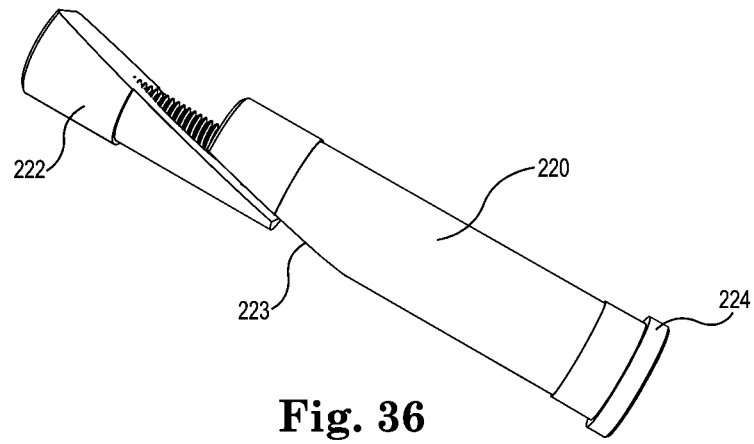
FIG. 36 is a perspective view of a mechanical joining device according to an example embodiment of the present invention.
Figure 37:
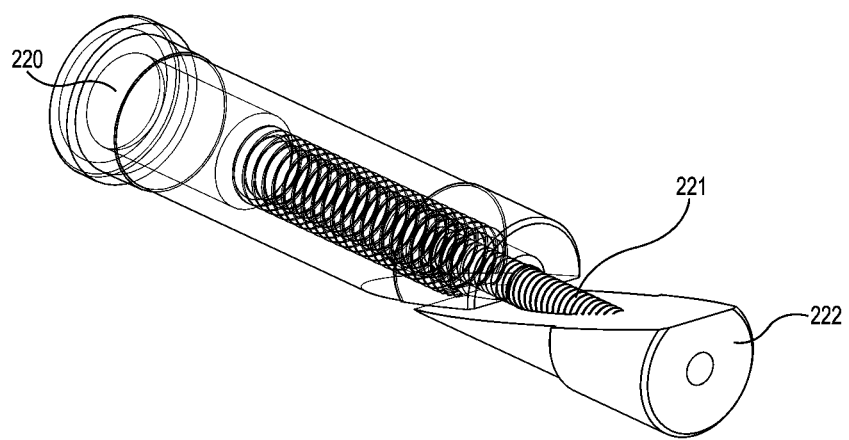
FIG. 37 is an internal detail perspective view of a mechanical joining device according to an example embodiment of the present invention.

Another configuration of a shaft joining system is shown in FIGS. 36-37. This insert assembly comprises a base portion 220 and an adjustable wedge portion 222. As shown, an adjustment screw 221 is tightened to retract or draw the wedge portion 222 up the sloped cam surface 223 of the base portion 220 to gradually increase the effective outside diameter of the joining device. The keyed end of the screw 221 is accessed through an open end of the base portion 220. The flange 224 abuts the end of the shaft into which the joining device is inserted. However, the flange can be omitted so that the joining device can be used as a mechanical joiner of two components that have the same inside diameter dimensions. The components can include shafts (such as for golf or archery), arrow tips, arrow nocks, golf club heads, etc. Sections of tubing and piping can also be joined using this device, method and system.

Figure 38:
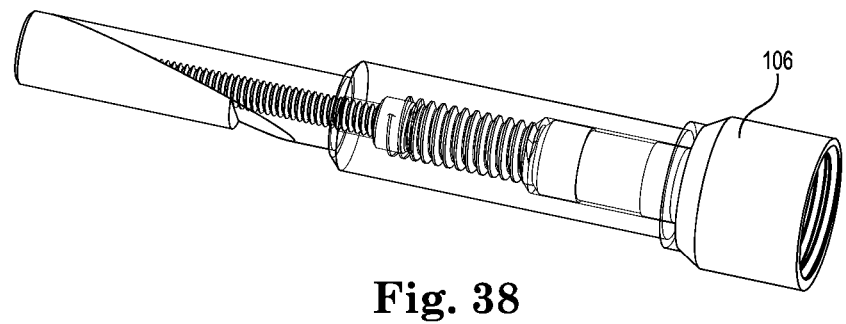
FIG. 38 is an internal detail perspective view of an insert according to an example embodiment of the present invention.

FIG. 38 illustrates a further embodiment showing the receiving element 106 configured to define a sloped base portion 220 as discussed in the preceding embodiment. This illustrates the modularity and flexible application of aspects of the various embodiments of the invention described herein.

Figure 39:
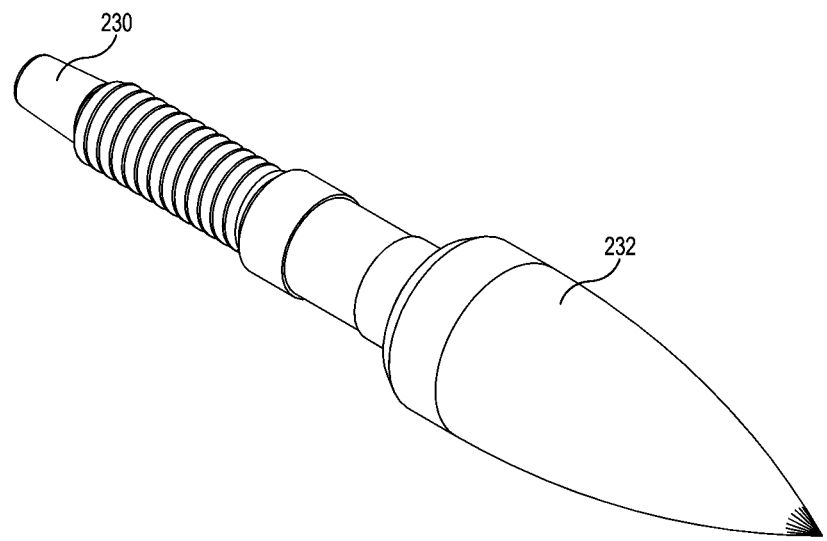
FIG. 39 is a perspective view of a field tip according to an example embodiment of the present invention.
Figure 40:
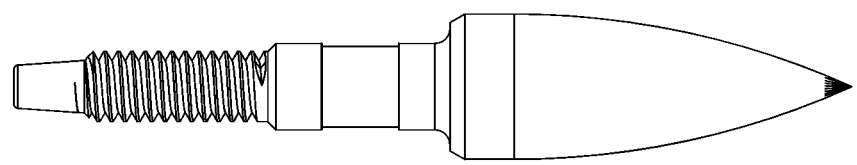
FIG. 40 is a side view of a field tip according to an example embodiment of the present invention.

FIGS. 39-40 illustrate the embodiment of a tapered shank end 230 defined on the end of a field point 232 or other broadhead. The tapered shank end functions similarly to the tapered portion of the set screw 108 discussed in the first embodiment. However, the present embodiment reduces the number of components by incorporating the tapered feature as part of a singular component. Doing this also eliminates the need for a wrench or other tool to operate the keyed recess in the set screw.

Figure 41:
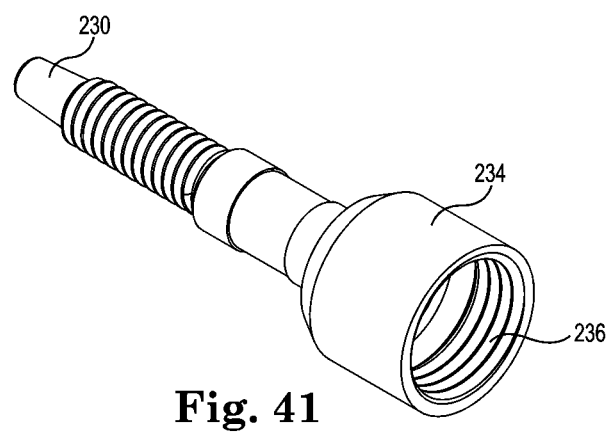
FIG. 41 is a perspective view of an adapter according to an example embodiment of the present invention.
Figure 42:
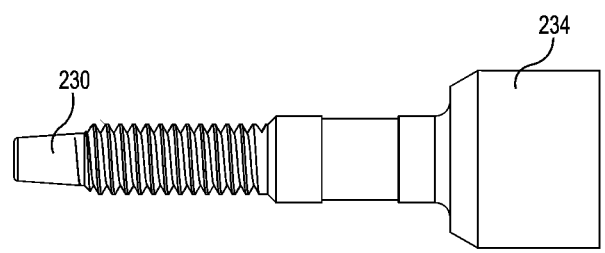
FIG. 42 is a side view of an adapter according to an example embodiment of the present invention.

FIGS. 41-42 illustrate the same unitary incorporation of the tapered surface 230 on a shank of a female receiving portion 234 of an arrow head attachment system as discussed above. A female threaded end 236 can receive a variety of broad heads or other components as the user may desire.

Figure 43:
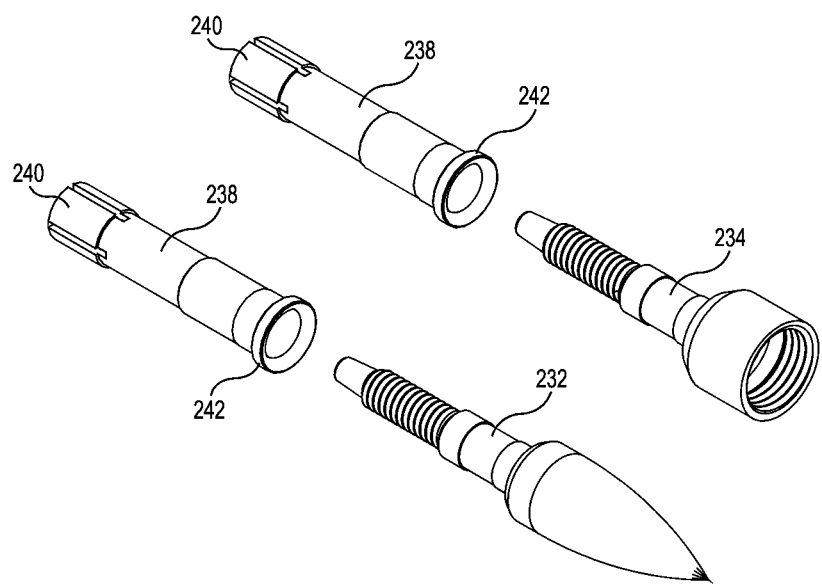
FIG. 43 is a perspective view of an adapter joining assembly and a filed tip joining assembly according to example embodiments of the present invention.

FIG. 43 illustrates the field point 232 and receiving portion 234 aligned prior to insertion into an insert element 238. The insert element 240 features expandable finger elements 240, as discussed previously, that expand outwardly as the respective field point 232 or receiving portion 234 is threaded into the insert element. The insert element is provided with a stop flange or collar portion 242 to abut against an end of the shaft, while the remainder of the insert element 238 resides within the arrow shaft.

As explained herein the mechanical locking devices according to the various embodiments described herein can be configured and used as an alternative to threaded engagements between two components.

The mechanical locking device, system and method of the invention can further be used to attach external fletching components such as those from NUFLETCH. The mechanical interlocking device in such device replaces the 8-32 threads, thereby eliminating the need for a female 8-32 threaded insert. The product weight would thus be substantially reduced.

The various embodiments herein can use 8-32 thread configurations that are common in the archery industry. However, 6-40 threading configuration can also be used, or other threading configurations can be used, without departing from the scope of the invention.

The arrow insert according to certain embodiments provides certain advantages over conventional inserts. One such advantage is that no glue is needed to retain the insert inside of the arrow shaft. Arrow shafts are expensive and the conventional shafts must be glued in place with epoxy. Only after the epoxy has set (about 24 hours) can the assembled arrows be used. The present invention takes only seconds to install in a shaft and be ready to shoot.

Inserts that are glued in place are considered a onetime use. In contrast, the inserts of the present invention allow the user to reuse the insert over and over again.

With conventional inserts, the tool that is provided to set the internal insert in place is plastic and does not allow the user to align or "index" the arrow vanes to the blades on the broadhead. Also, this tool can allow a small amount of epoxy to coat the inside of the arrow during the installation process. A very small amount of glue can render the arrow unusable as the inside diameter of the arrow shaft is typically 0.204" and the shank on most broadheads is 0.202".

An advantage of certain embodiments of the present invention is the elimination of the conventional bevel tool and beveling operation needed for conventional inserts. With conventional inserts, once the arrow has been cut to length, the inside diameter of the arrow shaft must be beveled to match the radius of the broadhead (typically 0.020"). A small stone grinding tool it typically provided to apply the bevel. In contrast, the present invention allows the field point, arrow head or fletching system to make contact with the beveled section of the present invention.

Alternatively, a beveled spacer can be used to eliminate the need to grind the inside diameter of the arrow shaft. The spacer has the required radius (e.g., 0.020") formed into the part and provides a more accurate and stronger interface between the various arrow components. The beveled spacer can also be color coded to indicate the appropriate yardage (if laser broadheads are used) or to indicate the classification of the arrow. The color coding can be provided by the user using an indelible marker (color of the end user's choice) or can be embedded in the material or coated on the material forming spacer.

An advantage of all embodiments is the ability to index the arrow head. It is very desirable to align the blades of the broadhead to the vanes of the arrow shaft as indicated previously. Alignment provides better flight characteristics and repeatable results between many different arrows (tighter arrow groups). Because the conventional inserts are glued into place, the user will have to index the broadhead to the arrow shaft at the time that the insert is installed. Once the insert and broadhead are glued into place, the two parts are a matched set. If the arrow or broadhead is damaged, it will be nearly impossible to obtain another broadhead to match the same indexed position as the original (onetime use). The present invention, however, allows the end user to reuse the insert (reset the index position) as described herein, so the arrow can be used on multiple broadheads (reusable instead of a onetime use).

The various features of the embodiments described herein can be combined to form additional embodiments not specifically described herein. For example, the wedge interlocking mechanism of FIGS. 26-37 can be used in place of the expandable portions provided in FIGS. 1-25, and vice-versa.

The various components of the arrow inserts, half-out inserts, and outserts described herein can be formed from a variety of materials without departing from the scope of the invention. In one embodiment, the components are a metal such as aluminum or magnesium. In another example embodiment one or more components are plastic or a composite.

The present invention can also be used in with a laser broadhead as disclosed in U.S. Pat. No. 8,251,845 and co-pending U.S. patent application Ser. No. 13/273,932. Both of the above-listed US Patent and Application and U.S. Pat. No. 7,115,055 are hereby incorporated herein by reference in their entirety.

Various embodiments of the present invention can also be used in conjunction with the electronic archery sighting system disclosed in U.S. Pat. No. 8,286,871, the entire disclosure of which is hereby incorporated by reference.

The above disclosure is related to the detailed technical contents and inventive features thereof. People skilled in this field may proceed with a variety of modifications and replacements based on the disclosures and suggestions of the invention as described without departing from the characteristics thereof. For example, the invention is also applicable to cross bows, bowfishing, sling bow fishing/hunting, spear fishing guns and other projectiles that would benefit from a laser aiming pointed tip. Nevertheless, although such modifications and replacements are not fully disclosed in the above descriptions, they have substantially been covered in the following claims as appended.

What is claimed is:

1. A glueless shaft interlocking mechanism for a shaft having a hollow interior, comprising:

a base insertable into the hollow interior of the shaft, the base including a distal end disposable into the hollow interior of the shaft, a proximal end opposite the distal end, and a plurality of flexible fingers separated by a slot defined between each of the adjacent flexible fingers, each slot extending from the distal end towards the proximal end, the base having a hollow interior extending through an entire longitudinal length of the base, the interior including a threaded portion adjacent to the distal end and extending inwards in a proximal direction therefrom; and a set screw insertable into the threaded portion of the hollow interior of the base, the set screw comprising:
a head portion, the head portion being threaded and having a diameter such that no deflection of the flexible fingers occurs due to the head being disposed within the hollow interior of the base, the head portion defining a tool receiving recess therein which is oriented toward the proximal end of the base when the set screw is threaded into the base; and
a tail portion, the tail portion of the set screw including a non-threaded outer surface that diverges as it extends distally away from the head portion of the set screw such that the outer surface of the tail portion deflects the flexible finger portions of the base laterally outwardly as the set screw is advanced in the proximal direction through at least a part of the threaded portion of the base.

2. The mechanism of claim 1, wherein the hollow interior of the base includes a non-threaded portion disposed between the threaded portion and the proximal end, wherein the set screw cannot advance proximally into the non-threaded portion.

3. The mechanism of claim 1, further comprising a flange extending outwardly from the base to define a shaft insertion stop.

4. The mechanism of claim 3, wherein the flange is longitudinally located along the base proximally of the threaded portion of the base.

5. The mechanism of claim 1, wherein the proximal portion of the base comprises a threaded male post.

6. A method of gluelessly interlocking with a shaft having a hollow interior, the method comprising:
  inserting a distal end of an insert into a first end of a hollow shaft in a distal direction, wherein the insert includes a hollow channel extending longitudinally through the insert, the distal end of the insert defining a plurality of flexible fingers separated by a slot defined between each of the fingers, each of the slots extending inwards from the distal end, and the insert including a threaded portion along the hollow channel;
  threading a threaded head of a set screw into the threaded portion of the insert, the threaded head of the set screw having a thread diameter such that the plurality of flexible fingers are not flexed outwards by the threaded head being located within the threaded portion of the insert; and
  accessing the threaded head of the set screw through the hollow channel from a proximal end of the insert to advance the set screw in the proximal direction into the threaded portion such that a tapered tail of the set screw extending distally from the threaded head of the set screw flexes the plurality of flexible fingers against an inner surface of the hollow interior of the shaft as the tapered tail advances proximally through the hollow channel of the insert.

7. The method of claim 6, wherein the step of threading the threaded head of a set screw into the threaded portion of the insert is performed prior to the step of inserting the distal end of the insert into the first end of a hollow shaft.

8. The method of claim 6, wherein the hollow shaft is an arrow shaft.

9. The method of claim 6, wherein the distal end is inserted into the first end of a hollow shaft until a flange extending outwardly from the insert contacts the first end of the shaft to prevent further insertion in the distal direction.

10. The method of claim 6, further comprising defining a tool-engaging recess in the threaded head of the set screw, wherein the tool-engaging recess is aligned with the hollow channel to permit access through the hollow channel from the proximal end of the insert.

11. A glueless shaft interlocking mechanism for an arrow shaft having a hollow interior, comprising:
  an insert insertable into the hollow interior of the arrow shaft, the insert including a distal end disposable into the hollow interior of the shaft, a proximal end opposite the distal end, and a plurality of flexible fingers separated by a slot defined between each of the adjacent fingers, each of the slots extending proximally from the distal end, the insert defining a hollow channel extending from the distal end to the proximal end of the insert, the hollow channel including a threaded portion; and
  a set screw insertable into the threaded portion of the insert, the set screw comprising:
    a threaded head portion having a thread diameter such that no deflection of the flexible fingers occurs due to the threaded head being disposed within the threaded portion of the insert, and the threaded head portion defining a tool receiving recess therein which is oriented toward the proximal end of the insert when the set screw is threaded into the insert; and
    a non-threaded tail portion having an outer surface that radially diverges as it extends distally away from the threaded head to deflect the finger portions of the insert laterally outwardly as the set screw is advanced in the proximal direction through at least a part of the threaded portion of the insert.

12. The mechanism of claim 11, wherein the hollow channel of the insert includes a non-threaded portion disposed between the threaded portion and the proximal end, wherein the set screw cannot advance proximally into the non-threaded portion.

13. The mechanism of claim 11, further comprising a flange extending outwardly from the insert to define an arrow shaft insertion stop.

14. The mechanism of claim 13, wherein the flange is longitudinally located along the insert proximally of the threaded portion.

15. The mechanism of claim 11, wherein the proximal portion of the insert comprises a threaded male post.

* * * * *